Feb. 3, 1970    R. L. SEIDLER    3,493,813
LAMP FLASHER

Filed March 6, 1968    2 Sheets-Sheet 1

INVENTOR.
ROBERT L. SEIDLER
BY Albert F. Kronman
ATTORNEY

United States Patent Office 3,493,813
Patented Feb. 3, 1970

3,493,813
LAMP FLASHER
Robert L. Seidler, 6 Plymouth Road,
Summit, N.J. 07901
Filed Mar. 6, 1968, Ser. No. 710,820
Int. Cl. H05b 37/02, 39/04
U.S. Cl. 315—209          8 Claims

ABSTRACT OF THE DISCLOSURE

A solid state lamp flasher including three transistors and a single capacitor. When the load is disconnected, all the transistors are non-conductive. The circuit starts its operations as soon as the load is connected. The start action lights the first lamp immediately after the load switch is closed. During the time the load is disconnected, the circuit draws substantially no current even though the power supply is always connected.

Background of the invention

Prior art lamp flashers have included devices which use heat responsive components for operating contacts and for cutting off current to one or more flashing signal lamps. Such devices are subject to pitting of the contacts, permanent set of the heat responsive elements and are often not independent of load current or ambient temperature. Previously known transistorized devices usually dissipated a large portion of the available voltage across the switching transistor. The switching transistor thus required a high power rating and heat sinking. In addition, these flashers did not turn on immediately and did not maintain full relay contact pressure throughout the flash on relay types, resulting in the excessive heating and arcing of the contacts.

Summary of the invention

In one embodiment of the invention no make and break contacts are used nor are there any moving parts. The circuit includes three transistors, one capacitor, and six resistors. A second embodiment includes the same basic circuit with the addition of a relay. The relay is added when high load currents must be switched. In still a third embodiment employing the same basic circuit only two transistors are used.

For a better understanding of the invention, together with other details and features thereof, reference is made to the following description taken in connection with the accompanying drawings.

Description of the preferred embodiments

Figure 1:
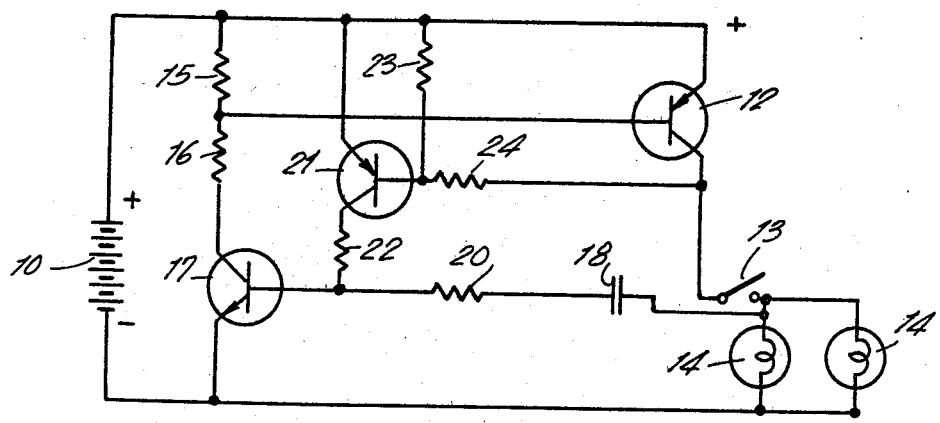
FIGURE 1 is a schematic diagram of connections of one preferred form of the invention.

Referring now to FIGURE 1, the flasher circuit is connected to a direct current power source 10 which may be a vehicle storage battery. A first transistor 12 is connected with its emitter-collector electrodes in series with the power source, a load switch 13, and one or more lamps 14 which are to be flashed or lighted at specific intervals to designate a signal.

The first transistor 12 is controlled to be fully conducting or non-conducting by a connection from its base electrode to a voltage divider made up of resistors 15 and 16, connected between the positive terminal of the source 10 and the collector of a second transistor 17. The emitter of transistor 17 is connected to the negative terminal of the source 10 and the base is connected to a capacitor 18 in series with a resistor 20. The "on" time is controlled by the valves of capacitor 18 and resistor 20. The "off" time is controlled by the values of resistors 20 and 22.

A third transistor 21 has its emitter connected to the positive supply conductor, its collector connected to the base of transistor 17 in series with resistor 22, and its base connected to the mid-point of a voltage divider composed of resistors 23 and 24. This voltage divider 23, 24 is connected across the collector and emitter electrodes of transistor 12.

The operation of this circuit is as follows: when switch 13 is open, all three transistors are non-conductive and the circuit consumes no power. This condition is due to the fact that the bases of all transistors 21, 12 and 17 are at the same potential as their emitters. Capacitor 18 has no charge at this time.

When switch 13 is closed, the base of transistor 21 is connected to the negative terminal of the source through the resistor 24 and the resistance of the load 14. This bias makes transistor 21 conductive and positive potential is applied to the base of transistor 17 making it conductive and causing current to flow from the positive conductor, through resistors 15 and 16, then through the collector-emitter electrodes of transistor 17, to the negative conductor. Current through resistor 16 and the base emitter junction of transistor 12, causes it to become conductive and send current through the load, at the same time charging capacitor 18 through resistor 20 and the base emitter junction of transistor 17. The above series of events occurs immediately.

The application of positive voltage to the right hand side of capacitor 18 provides a current pulse to the base of transistor 17 to make it conductive. However, as capacitor 18 charges through resistor 20 and the base emitter junction of transistor 17, after a time determined by the values of resistor 20 and capacitor 18, the current through the base emitter junction of transistor 17 is not sufficient to maintain saturation of transistor 17 and transistor 17 thus becomes less conductive. This reduces the current through the base emitter junction of transistor 12 to the point where its saturation is not maintained. As the voltage of the collector of transistor 12 drops, the charge on capacitor 18 applies a negative bias to the base of transistor 17, maintaining it in an "off" condition which in turn shuts transistor 12 off completely. When transistor 12 turns off, transistor 21 turns on discharging capacitor 18 through resistors 20, 22, time "off" being determined by the values of resistors 20, 22, and the charge on capacitor 18.

Figure 2:
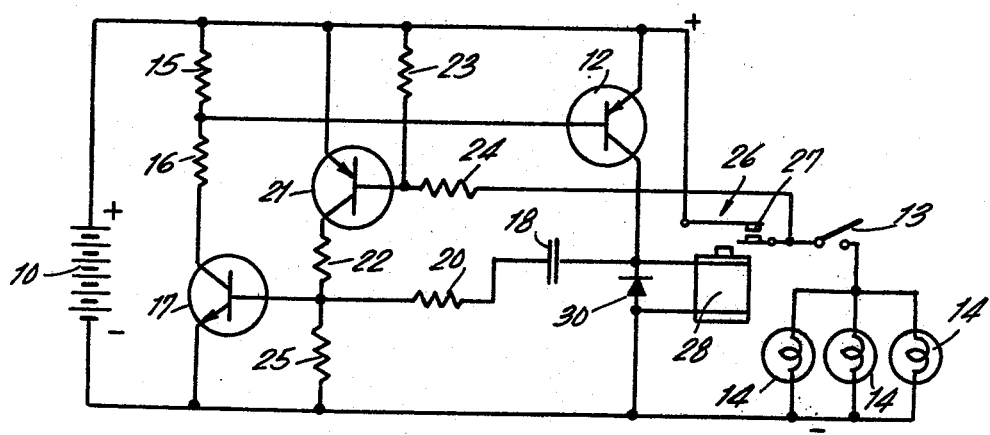
FIGURE 2 is a schematic diagram of connections similar to FIGURE 1 but including a relay for flashing heavier and variable loads.

The flasher circuit shown in FIGURE 2 is the same as that shown in FIGURE 1 except that a relay 26 has been added to switch larger currents to the load 14. The relay 26 includes contacts 27 connected in series between the positive terminal of the source 10 and the load switch 13. The relay winding 28 is connected in series between the collector of transistor 12 and the negative terminal of the potential source 10. A diode 30 is bridged across the winding 28 in order to absorb the reverse voltage pulse generated by the winding when the current is cut off and the magnetic field collapses. In this circuit an additional resistor 25 has been added to discharge capacitor 18 when switch 13 is opened to stop the flashing sequence. With capacitor 18 completely discharged, the circuit can be turned on again and the load current will start as soon as switch 13 is closed.

Both lamp flasher circuits described above are substantially independent of ambient temperature since the flashing sequence does not depend upon the heating and cooling of any component. Two of the three transistors are operated so as to be either non-conductive or conducting, the third transistor varies between a substantially fully conducting and a non-conducting state.

Figure 3:
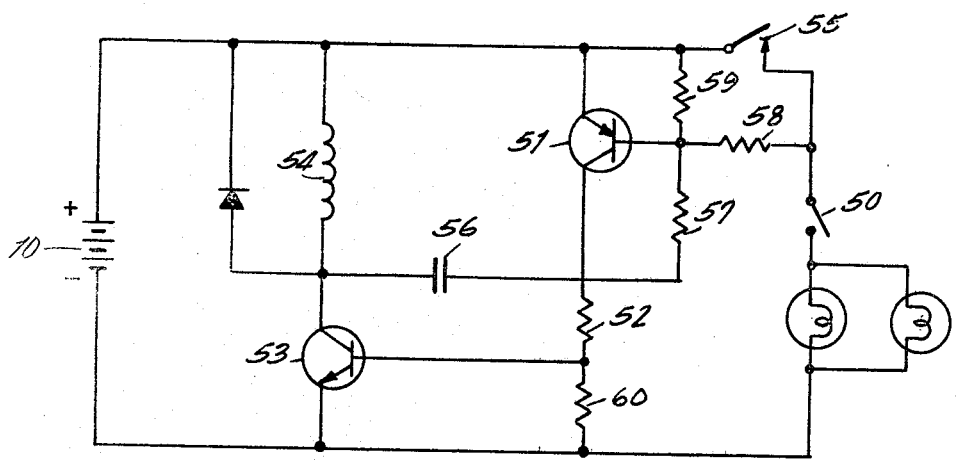
FIGURE 3 is a schematic diagram of connections similar to FIGURE 2 but employing two transistors in the flasher circuit.

The flasher circuit shown in FIGURE 3 is similar to those shown and described above in connection with FIGURES 1 and 2 except that two transistors are employed to perform the functions of three.

In the embodiment of FIGURE 3, the base of transistor 51 is initially connected to resistor 58. When load switch 50 is closed, transistor 51 is turned on, which in turn, through resistor 52 turns on transistor 53. Transistor 53 applies current to relay coil 54 closing relay contacts 55.

The capacitor 56 charges through resistor 57 and the base emitter junction of transistor 51, maintains conduction of transistor 51 until the charging current decreases to the point at which transistor 51 becomes less conductive. This allows the collector voltage of transistor 53 to rise, applying a reverse bias voltage through capacitor 56 and resistor 57 to the base of transistor 51. The cycle then repeats.

Having thus fully described the invention, what is claimed as new and desired to be secured by Letters Patent of the United States is:

1. A flashing circuit for generating intermittent current for application to a load comprising:
   (a) a source of direct current potential,
   (b) a load for receiving the intermittent current pulses,
   (c) a first transistor having its emitter and collector electrodes connected in series between the source and the load,
   (d) a second transistor for controlling the conductance of the first transistor and having its collector and emitter electrodes coupled to the source,
   (e) a first voltage divider including two resistors connected between the source and the collector electrode of the second transistor, the junction of the two resistors connected to the base of the first transistor for making it conductive when the second transistor is made conductive,
   (f) a capacitor in series with a resistor connected between the base of the second transistor and the collector of the first transistor,
   (g) and a resistor connected between the base of the second transistor and one of the load terminals.

2. A flashing circuit for generating intermittent current for application to a load comprising:
   (a) a source of direct current potential,
   (b) a load for receiving the intermittent current pulses,
   (c) a first transistor having its emitter and collector electrodes connected in series between the source and the load,
   (d) a second transistor for controlling the conductance of the first transistor and having its collector and emitter electrodes coupled to the source,
   (e) a first voltage divider including two resistors connected between the source and the collector electrode of the second transistor, the junction of the two resistors connected to the base of the first transistor for making it conductive when the second transistor is made conductive,
   (f) a third transistor for controlling the conductance of the second transistor having its emitter and collector electrodes coupled to the positive terminal of the source and the base electrode of the second transistor,
   (g) a second voltage divider connected across the emitter and collector electrodes of the first transistor and a connection between the mid-point of the voltage divider and the base of the third transistor for controlling the conductance of the third transistor,
   (h) and a capacitor in series with a resistor connected between the base of the second transistor and the collector of the first transistor.

3. A flashing circuit as claimed in claim 1 wherein said load is the filament of a lamp.

4. A flashing circuit as claimed in claim 1 wherein said load is the winding of a relay.

5. A flashing circuit as claimed in claim 1 wherein said source of potential is a storage battery.

6. A flashing circuit as claimed in claim 4 wherein the winding of the relay is adapted to close a pair of contacts when the winding receives current and to connect said source to a load.

7. A flashing circuit as claimed in claim 4 wherein a rectifier diode is connected across the terminals of the relay winding to absorb the inductive pulse generated in the winding when the current through the winding is cut off.

8. A flashing circuit as claimed in claim 4 wherein the second voltage divider is connected across the emitter electrode of the first transistor and one of the contacts on the relay.

References Cited

UNITED STATES PATENTS

| | | | |
|---|---|---|---|
| 2,901,669 | 8/1959 | Coleman | 315—158 |
| 3,130,349 | 4/1964 | Mallory | 315—209 X |
| 3,178,609 | 4/1965 | Skirvin | 315—206 |
| 3,188,623 | 6/1965 | Culbertson | 340—331 |
| 3,310,708 | 3/1967 | Seidler | 315—209 X |
| 3,391,304 | 7/1968 | Fabry | 315—210 |
| 3,404,311 | 10/1968 | Ruppert | 340—332 |
| 3,422,421 | 1/1969 | Moller et al. | 340—331 |

JOHN W. HUCKERT, Primary Examiner

ANDREW J. JAMES, Assistant Examiner

U.S. Cl. X.R.

315—158, 178, 200, 205; 340—331, 332